United States Patent
Andros

(10) Patent No.: US 7,648,178 B1
(45) Date of Patent: Jan. 19, 2010

(54) CONNECTOR FOR JOINING WITH AGRICULTURAL DRIP TAPE

(76) Inventor: Matthew J. Andros, 9760 Maria Ave., Santa Margarita, CA (US) 93453

( * ) Notice: Subject to any disclaimer, the term of this patent is extended or adjusted under 35 U.S.C. 154(b) by 0 days.

(21) Appl. No.: 12/288,704

(22) Filed: Oct. 22, 2008

(51) Int. Cl.
F16L 33/00 (2006.01)
(52) U.S. Cl. .......................... 285/247; 285/93
(58) Field of Classification Search ............... 285/247, 285/322, 248, 249, 93, 13
See application file for complete search history.

(56) References Cited

U.S. PATENT DOCUMENTS

| | | | | |
|---|---|---|---|---|
| 919,444 | A * | 4/1909 | Loetzer | 285/249 |
| 3,704,704 | A * | 12/1972 | Gonzales | 128/831 |
| 3,843,169 | A * | 10/1974 | Wise | 285/39 |
| 4,169,572 | A * | 10/1979 | Simon | 248/56 |
| 4,500,118 | A * | 2/1985 | Blenkush | 285/247 |
| 4,736,969 | A * | 4/1988 | Fouts | 285/247 |
| 4,951,976 | A * | 8/1990 | Boelkins | 285/114 |
| 5,178,423 | A * | 1/1993 | Combeau | 285/247 |
| 5,332,269 | A * | 7/1994 | Homm | 285/39 |
| 5,388,871 | A * | 2/1995 | Saitoh | 285/247 |
| 5,904,376 | A * | 5/1999 | Yuen | 285/39 |
| 6,017,066 | A * | 1/2000 | Giuffre' | 285/38 |
| 6,409,222 | B1 * | 6/2002 | Donoho et al. | 285/93 |
| 6,578,876 | B2 * | 6/2003 | Guertin, Jr. | 285/148.19 |
| 6,871,880 | B1 * | 3/2005 | Olson | 285/192 |
| 7,261,325 | B2 * | 8/2007 | Lien | 285/247 |
| 7,367,594 | B2 * | 5/2008 | Evans et al. | 285/247 |
| 7,527,300 | B2 * | 5/2009 | Li | 285/247 |

\* cited by examiner

*Primary Examiner*—David E Bochna
(74) *Attorney, Agent, or Firm*—Frederick Gotha

(57) ABSTRACT

A connector for joining agricultural drip tape. The connector includes a rigid tubular body having a tapered trust conical enlargement at its free end over which the free end of the drip tape is pressed and held by an assembly nut having a single entry female thread that threadably engages the tubular body male threads by a pre-determined angular advance of the assembly nut. The environment of use for agricultural drip tape is one of debris and mud consequently; the assembly nut contains a wiper window opening through which debris and mud are expelled from the connection as the assembly nut advances axially along the threads of the tubular body. Indicia on both the assembly nut and on the tubular body may be relatively positioned depending upon the thickness of the tape to form a consistently reliable seal.

17 Claims, 3 Drawing Sheets

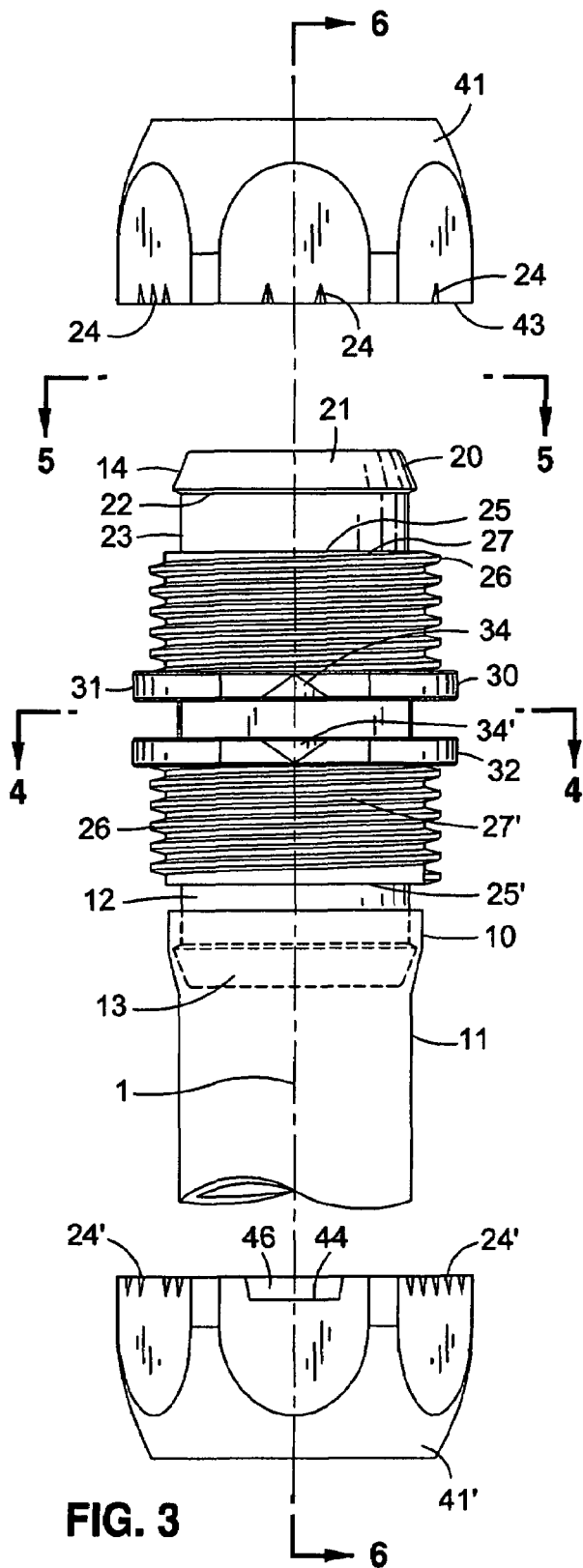
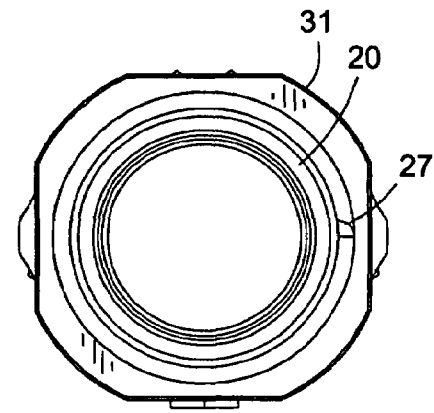
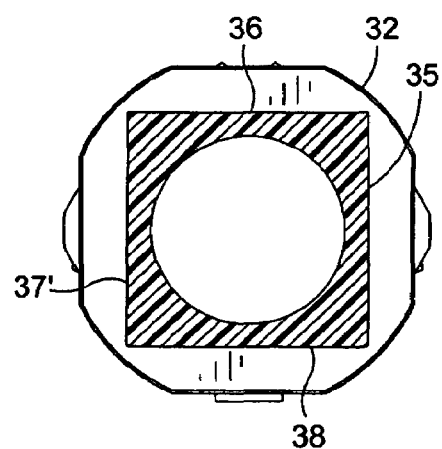
FIG. 3
FIG. 4
FIG. 5

CONNECTOR FOR JOINING WITH AGRICULTURAL DRIP TAPE

FIELD OF THE INVENTION

A connector to which the free end of a length of drip tape can readily and releasably be joined.

BACKGROUND OF THE INVENTION

In this specification the term "drip tape" will be used to describe this precise product and also any other type of drip conduit, including those in round form more properly described as tubes or tubing. These terms are used interchangeably in this specification. All these products are made of organic plastic material, usually with thin walls. They include in their length a series of spaced-apart emitters.

Emitters are passages through the walls from the lumen of the tape to its outside. They permit controlled flow of water through the wall at their specific places along the length of the tape and allow water to flow through them at a limited rate into the soil on or in which the tape is laid or implanted. These provide for application of water in known amounts at precise locations relative to the crop, plant, or tree, thereby saving water that would otherwise be wasted if it were applied where it was not required by the crop.

Very frequently these tapes are laid along a row, which may be as long as 2500 feet, from a central source such as a manifold. A plurality of tapes usually extends from the manifold which acts as a header. At its upstream end, each tape must be connected to the manifold and depending on the layout, at its downstream end to a splice that connects it to a next-downstream length of the tape to extend the length of a tape completely along a row.

Also frequently there are breaks in the tape after it is installed, and a splice must be made at the point of breakage. This point generally occurs in a muddy and inconvenient location. There are other problems, especially when joining the tape to a next body such as a coupler. One prevalent frustration derives from the inherent construction of drip tapes, which are usually provided flattened and wound on a reel for storage. The material is an organic plastic with a relatively thin wall. It is flexible enough to expand to a rounded shape when filled with water under pressure, and elastic enough that it can be stretched to fit on and over part of a connector.

The thickness of the drip tape material is deliberately made as thin as possible to save material, to facilitate its storage and carriage and to facilitate its engagement to a coupler. In the construction of various types of tubular drip tape, an internal axially extending lip occurs along the length of the tape when the plastic sheet material is fused at its overlapping edges to form the tube. The radial thickness of the internal lip is greater then that of the non-overlapping portions of the tube wall and consequently to obtain a watertight seal the internal lip must be sufficiently compressed by the coupler without deforming or excessively decreasing wall thickness of the un-overlapped portion. One of the problems this presents is that excessive tightening of the coupler may cause the coupler to cut through the tape, thereby preventing the desired connection. An accompanying problem is under tightening, because then the joint will come apart in use when under pressure.

Coupling of the drip tape may have to be made under both dry and wet conditions and in clean and muddy environments. The workman who relies on feel alone or depends on previous experience as he assembles the coupler to the tape may be misled into making an insufficient or damaging joinder. It is desirable therefore to form a coupling joint by eliminating guesswork and forming the joint by reference to objective criteria.

This invention involves pressing a stiffly flexible tubing over a shouldered coupler end and then tightening a nut onto the coupler and against the tubing utilizing objective criteria to consistently position the nut, without cutting the tape, to form a water tight seal. In the field, to produce this result routinely is a surprisingly large order.

BRIEF DESCRIPTION OF THE INVENTION

This invention provides for a joinder between a free end of an agricultural drip irrigation tape, or tubing, and a next body such as a coupler. The term "drip tape" is used herein to include not only flattened structures that inflate to a rounded or nearly-rounded shape, but also to initially tubular shapes. In every case they are flexible, and can be stretched enough to pass over the free end of the connector for retention purposes.

In accordance with this invention, the connector includes a rigid tubular body that terminates at its free end to a tapered enlargement over which the free end of the drip tape must be pressed and held. The drip tape makes a sealing contact against a circular portion of the enlargement. A male thread is adjacent to a rigid tubular section of the body and has a single entry. An assembly nut having a single entry female thread for engagement with the male thread on the tubular body is first positioned to circumferentially enclose the free end of the drip tape. The nut includes a tapered surface having an internal diameter smaller than the largest diameter of the enlargement. This permits the free end portion of the tape to fit between the tapered section and to be held there.

Because both the male body threads and nut threads are single entry, there is only one rotational position of the nut relative to the tubular body at which these threads can start to join. It is important to this invention that the nut must be tightened far enough to hold the tape to the tube and even to press it along slightly. Opposed to this consideration is that over-tightening can cause the nut to cut the tape thereby destroying the connection.

According to this invention, the tubular body and the nut are provided with body indicia and nut indicia, respectively, which depending upon the wall thickness and physical properties of the tape, will dictate to the assembler the correct selection of a particular nut indicia for alignment with the body indicia to form a consistently reliable seal. The relative positions of the indicia will have, by previous testing, been determined for the particular type drip tape to be joined. Thus, the assembler, by knowing the wall thickness and characteristic properties of the tape, and utilizing the test information, will, after hand tightening the nut to advance resistance, tool tighten the nut further until the test determined angular displacement of the nut indicia is positioned with respect to the body indicia.

The above can be accomplished while held in the hands. However, this is very difficult in the field. Although not shown, for this purpose, a bench tool is provided with a fixed fork to hold the body during the assembly process. The tubular body has a set of wrench flats for engagement by the fork to free the worker's hands for more important use. To prevent the nut from prematurely jamming, thereby restricting the axial advance of the nut as it engages the body threads; the nut includes a wiper window at the compressive end of the nut which permits mud or dirt deposits on the body male thread to be dredged through the opening as the nut threads onto the tubular body.

BRIEF DESCRIPTION OF THE DRAWINGS

The above and other features of this invention will be fully understood from the following detailed description and the accompanying drawings, in which:

FIG. 3 is an unassembled exploded front view of FIG. 1 illustrating a length of drip tape pressed unto the connector body.

FIG. 4 is a cross-sectional view taken along the line 4-4 of FIG. 3.

FIG. 5 is a top view taken along line 5-5 of FIG. 3.

DETAILED DESCRIPTION OF THE INVENTION

Figure 2:
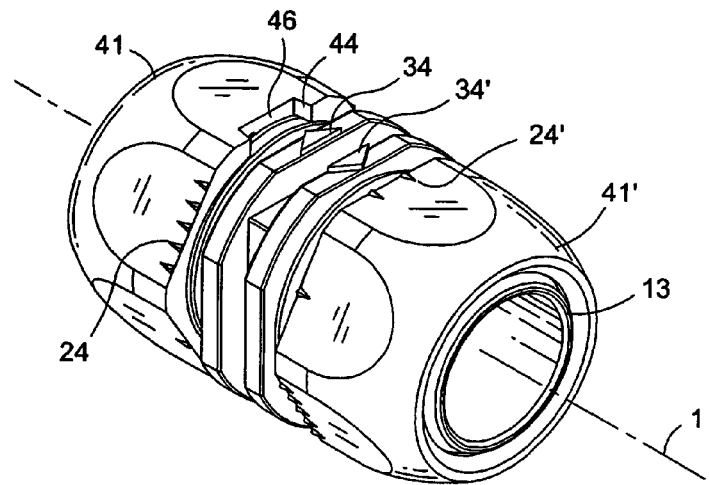
FIG. 2 is an assembled perspective view of FIG. 1.
Figure 1:
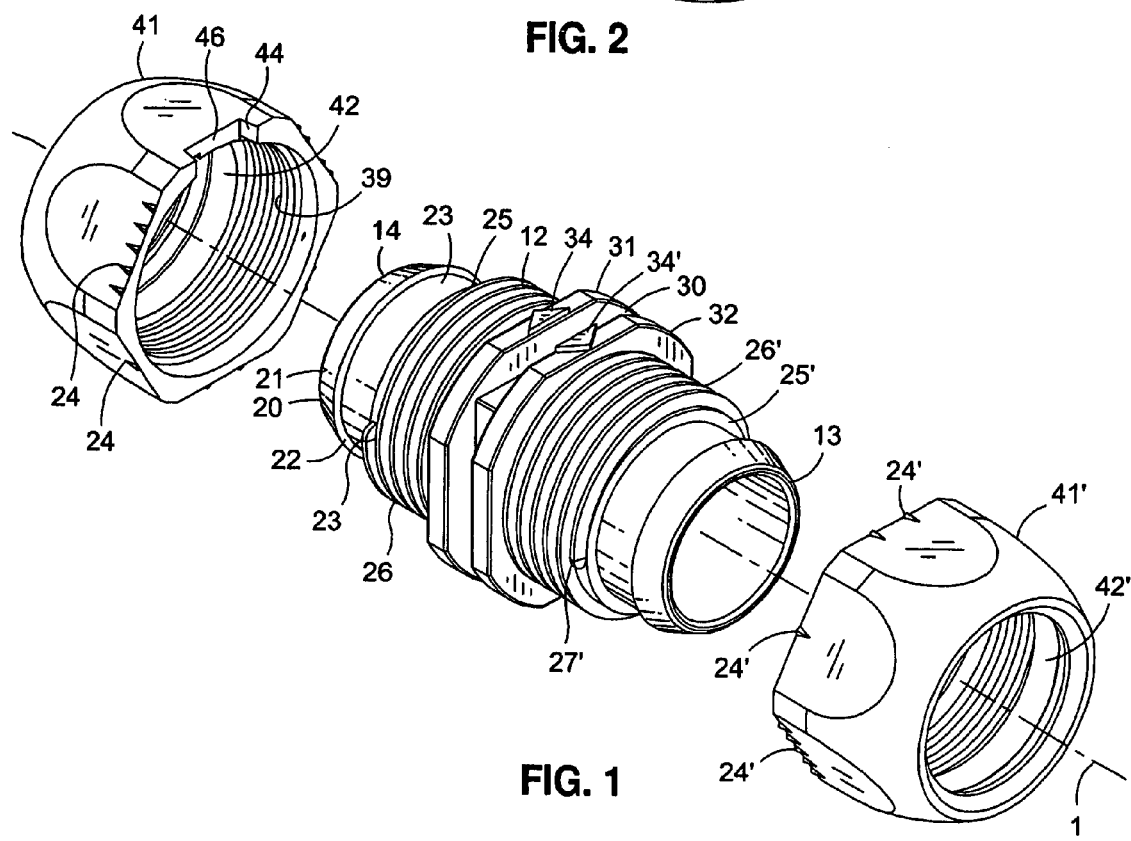
FIG. 1 is an exploded perspective view of the unassembled connector of this invention illustrating in perspective in spatial separation the respective tubular nuts and connector body.

FIG. 1 illustrates in perspective an exploded view of the tubular connector for joining drip tape and FIG. 2 illustrates in perspective the assembly of the various elements shown in FIG. 1. The purpose of this invention is to reliably join the free end 10 of a length 11 of irrigation drip tape to a tubular body 12 as can be seen by reference to FIG. 3. This connector may, for example be a rigid tubular structure which functions as a splice or coupler to join two such tape lengths, or it may be a projection from a manifold (not shown) to which the tape is to be connected.

For convenience in disclosure, tubular body 12 is shown in FIGS. 1 and 3 in its most common double-ended configuration, which is duplicated at each of its ends 13 and 14. End 14 will be described in detail, recognizing that end 13 and 14 are identical.

As can be seen in FIG. 1, tubular body 12 has a central axis 1 about which at the free end of 14 there is formed an encircling enlargement 20 with a frusto-conical face 21 enlarging to form a shoulder 22. A cylinder portion 23 is formed adjacent to shoulder 22. Its outer diameter is smaller than the largest diameter of shoulder 22. The cylinder portion terminates at shoulder 25 adjacent to enlarged thread 26. Shoulder 25 is identical to shoulder 25' which is shown at end 13 of tubular body 12.

Thread 26 is a single entry thread having an entry point 27. Adjacent to thread 26 is an enlarged peripheral disc 30. By referring to FIGS. 1 and 4, it can be seen that disc 30 incorporates two sets of hexagonal flats 31, 32, to provide a grip for the assembler. Referring to FIG. 2, hexagonal flats 31 and 32 have opposing body indicia 34 and 34', which are angularly spaced a pre-determined arcuate distance from entry points 27 and 27' of threads 26 and 26'. Hexagonal flats 31 and 32 are spaced apart by wrenching flats, namely 35 and 36, and by wrenching flats 37 and 38. As can be seen in FIG. 4, these flats form a square pattern for engagement by a wrench or bench tool.

Figure 6:
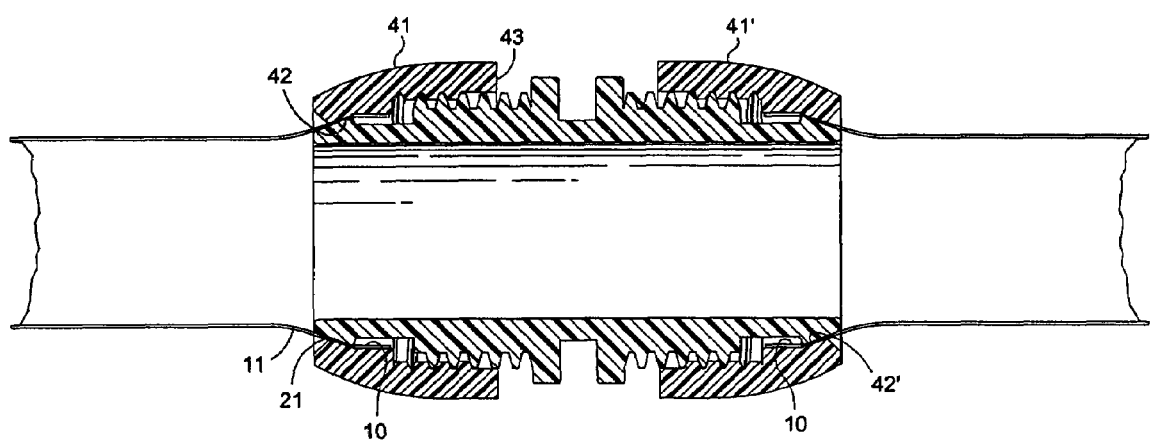
FIG. 6 is a cross-sectional view along the line 6-6 of FIG. 3 illustrating an assembled joinder of the connector and drip tape to form a seal.

A pair of tubular nuts 41 and 41' have circular internally tapered compression sections 42 and 42' which are illustrated in FIGS. 1 and 2. Since tubular nuts 41 and 41' are identical, the description hereafter of tubular nut 41 will apply to describe tubular nut 41'. Tubular nut 41 is internally threaded having threads 39 for single point entry at entry point 27 and is so dimensioned and proportioned to interfere with enlargement 20 at free end 14 of the connector when tightened. As can be seen in FIG. 6, when tubular nut 41 is tightened, the internally tapered section 41 compresses irrigation tape 11 against frusto-conical face 21 to form a peripheral seal.

Visible nut indicia 24 and 24' are located, as can be seen in FIGS. 1, 2, and 3, at equal angular intervals adjacent tubular nut 41's compressive end 43. Each of these nut indicia may represent known fractions of a turn of the nut relative to tubular body 12 indicia 34. It is desirable, because of mud or dirt deposits which may cover threads 26 during use in the field, to dredge such debris from thread 26 as the nut is tightened; without such dredging, the nut's axial advance along thread 26 may be prematurely restricted or jammed thereby rendering test results unusable for the positioning of the nut indicia with respect to the tubular body indicia to form a reliable seal. To alleviate this condition, nut 41 is so constructed and dimensioned to provide a wiper window 44 shown in FIGS. 1, 2, and 3 which prevents a build-up of debris by permitting it to be dredged from male threads 26 as the nut tightens and to flow through wiper window opening 46.

In use, as illustrated in FIG. 3, the free end 10 of the irrigation tape 11 is passed through tubular nut 41 and the free end 10 then pressed past enlargement 20 into compressive bearing against shoulder 25. Tubular nut 41, having been previously positioned with respect to the irrigation tape, is then hand tightened until further axial advance resistance along threads 26 is reached. By previously known testing results obtained from various wall thickness irrigation tape coupled with the connector, the assembler is aware, for the particular type of irrigation tape to be joined, of the required angular displacement needed of the nut to form a reliable seal. Thus, the nut, after axial advance resistance is reached by hand tightening, is thereafter tool tightened until the predetermined relative position of tubular body indicia and nut indicia is achieved.

This invention is not to be limited by the embodiment shown in the drawings and described in the description, which are given by way of example and not of limitation, but only in accordance with the scope of the appended claims.

I claim:

1. A tubular connector for joining with agricultural drip tape, said drip tape comprising an elongated tubular wall having a free end to be joined to said connector, the material of the drip tape being amenable to forming a round shape which can be elastically enlarged, said tubular connector comprising:

a rigid tubular body having a central axis and a body free end onto and over which the tape free end of the drip tape can be pressed, a tapered enlargement on said body free end increasing in diameter from said body free end and terminating in a circular edge which has a diameter, an external cylindrical spacer having a diameter less then said diameter of said circular edge, a single male thread extending axially from said spacer, said thread having a single entry, and a peripheral shoulder between said thread and said spacer;

a tubular nut having a compression end and a concially tapered portion, having dimensions which interfere the dimensions of said tapered enlargement, but which enable the drip tape to pass between them, an internal tubular spacer segment, and a female thread extending from said spacer segment having a single entry;

visible nut indicia on said tubular nut and visible body indicia on said tubular body where said visible nut indicia comprise a series of angularly spaced indicia indicative of angular increments of advancement of said tubular nut with respect to said body indicia when turned on said male thread thereby to indicate mechanical pressure of the tapered enlargement of the tubular nut against the tapered enlargement of the tubular body whereby with the tape free end of said drip tape pressed beyond said circular edge and said tubular wall of the drip tape pressed against the tapered enlargement, said nut indicia may be turned through a predetermined rotation to hold the drip tape in place, knowledge of the drip tape and its wall strength enabling the worker to turn said tubular nut to a pressure and known joinder without being cut.

2. The tubular connector recited in claim 1 where said tubular nut comprises a wiper window opening extending laterally through said tubular nut adjacent said compression end for permitting debris flow therethrough upon axial advance of said tubular nut with respect to said male threads.

3. The tubular connector recited in claim 2 where said tubular body further comprises a peripheral disc extending radially from said tubular body and axially removed from said body free end for permitting said tubular body to be captively held during threaded engagement with said tubular nut.

4. The tubular connector recited in claim 3 where said peripheral disc comprises a radially extending hexagonal flat disk having said visible body indicia thereon.

5. The tubular connector recited in claim 4 further comprising a wrenching peripheral surface extending axially from and integrally associated with said peripheral disk.

6. The tubular connector recited in claim 5 where said peripheral disc comprises a pair of radially extending hexagonal flat discs spaced axially apart and a wrenching peripheral surface integrally adjoining said hexagonal flat discs.

7. A tubular device for coupling elastically enlargeable drip tape having a tape free end to form a seal, comprising:
   a) a tubular body having a central axis, visible body indicia, and a body free end where said body free end has a frusto-conical shape for elastically expanding said tape free end upon sliding engagement with said body free end, said tubular body having a multiplicity of male threads having a single entry where said single entry is axially spaced from said frusto-conical shape;
   b) a tubular nut having a compression end and a conically tapered end portion, where said tubular nut has internal threads, said internal threads having a single entry adjacent said compressive end for threaded engagement with said male threads, and where said tubular nut has a wiper window opening extending laterally through said tubular nut adjacent said compressive end for permitting debris flow therethrough upon axial advance of said tubular nut with respect to said male threads, where said conically tapered end portion is so dimensioned and proportioned to compressively engage said frusto-comical shape upon sufficient axial threaded advancement of said tubular nut such that said tape free end is compressed there between forming a circumferential seal; and
   c) visible nut indicia angularly spaced at known angular increments on said tubular nut for angularly positioning said nut indicia with respect to said body indicia to form said circumferential seal without cutting said drip tape.

8. The tubular device recited in claim 7 where said tubular body further comprises a peripheral disc extending radially from said tubular body and axially removed from said body free end for permitting said tubular body to be captively held during threaded engagement with said tubular nut.

9. The tubular device recited in claim 8 where said peripheral disc comprises a radially extending hexagonal flat disk having said visible body indicia thereon.

10. The tubular device recited in claim 9 further comprising a wrenching peripheral surface extending axially from and integrally associated with said peripheral disk.

11. The tubular device recited in claim 8 where said peripheral disc comprises a pair of radially extending hexagonal flat discs spaced axially apart and a wrenching peripheral surface integrally joining and abutting said hexagonal flat discs.

12. A tubular connector for joining with agricultural drip tape, said drip tape comprising an elongated tubular wall having a free end to be joined to said connector, the material of the drip tape being amenable to forming a round shape which can be elastically enlarged, said tubular connector comprising:
   a rigid first tubular body having a central axis and a first body free end onto and over which the tape free end of the drip tape can be pressed, a tapered enlargement on said first body free end increasing in diameter from said first body free end and terminating in a circular edge which has a diameter, an external cylindrical spacer having a diameter less then said diameter of said circular edge, a single male thread extending axially from said spacer, said thread having a single entry, and a peripheral shoulder between said thread and said spacer;
   a rigid second tubular body having a coincident central axis and a second body free end onto and over which a tape free end of drip tape can be pressed, a tapered enlargement on said second body free end increasing in diameter from said second body free end and terminating in a circular edge which has a diameter, an external cylindrical spacer having a diameter less then said diameter of said circular edge, a single male thread extending axially from said spacer, said thread having a single entry, and a peripheral shoulder between said thread and said spacer;
   a first tubular nut having a compression end and a concially tapered portion, having dimensions which interfere the dimensions of said tapered enlargement, but which enable the drip tape to pass between them, an internal tubular spacer segment, and a female thread extending from said spacer segment having a single entry;
   visible nut indicia on said first tubular nut and visible first body indicia on said first tubular body where said visible nut indicia comprise a series of angularly spaced indicia indicative of angular increments of advancement of said first tubular nut with respect to said first body indicia when turned on said male thread thereby to indicate mechanical pressure of the tapered enlargement of said first tubular nut against the tapered enlargement of the first tubular body whereby with the tape free end of said drip tape pressed beyond said circular edge and said tubular wall of the drip tape pressed against the tapered enlargement, said visible nut indicia may be turned through a predetermined rotation to hold the drip tape in place, knowledge of the drip tape and its wall strength enabling the worker to turn said first tubular nut to a pressure and known joinder without said drip tape being cut;
   a second tubular nut having a compression end and a concially tapered portion, having dimensions which interfere the dimensions of said tapered enlargement, but which enable the drip tape to pass between them, an internal tubular spacer segment, and a female thread extending from said spacer segment having a single entry;
   visible nut indicia on said second tubular nut and visible body indicia on said second tubular body where said visible nut indicia comprise a series of angularly spaced indicia indicative of angular increments of advancement of said second tubular nut with respect to said second body indicia when turned on said male thread thereby to indicate mechanical pressure of the tapered enlargement of said second tubular nut against the tapered enlargement of the second tubular body whereby with the tape free end of said drip tape pressed beyond said circular edge and said tubular wall of the drip tape pressed against the tapered enlargement, said nut indicia may be turned through a predetermined rotation to hold the drip tape in place, knowledge of the drip tape and its wall strength enabling the worker to turn said second tubular nut to a pressure and known joinder without said drip tape being cut.

13. The tubular connector recited in claim 12 where said first tubular nut comprises a wiper window opening extending laterally through said first tubular nut adjacent said compression end for permitting debris flow therethrough upon axial advance of said first tubular nut with respect to said male threads.

14. The tubular connector recited in claim 13 where said second tubular nut comprises a wiper window opening extending laterally through said second tubular nut adjacent said compressive end for permitting debris flow therethrough upon axial advance of said second tubular nut with respect to said male threads.

15. The tubular connector recited in claim 14 further comprising a peripheral disc located intermediate said first and second body free ends and extending radially from said first and second tubular bodies for permitting said first and second tubular bodies to be captively held during threaded engagement with said first and second tubular nuts.

16. The tubular connector recited in claim 15 where said peripheral disc comprises a pair of radially extending hexagonal flat disks having said visible body indicia respectively thereon.

17. The tubular connector recited in claim 16 further comprising an axially extending wrenching peripheral surface in abutting relationship with said hexagonal flat disks.

* * * * *